United States Patent Office 3,450,609
Patented June 17, 1969

3,450,609
ELECTROLYTIC PROCESS FOR PREPARING HYDROGEN FLUORIDE
William W. Carlin, Portland, Tex., assignor to PPG Industries Inc., Pittsburgh, Pa., a corporation of Pennsylvania
No Drawing. Filed Mar. 14, 1966, Ser. No. 533,862
Int. Cl. B01k 1/00
U.S. Cl. 204—103                      8 Claims

ABSTRACT OF THE DISCLOSURE

Hydrogen fluoride is produced by the electrolysis of a catholyte selected from the group consisting of alkali metal fluoride and ammonium fluoride solutions in an electrolytic cell wherein the catholyte is separated from an electrically conductive anolyte by an anion exchange membrane.

---

This invention relates to a novel process of preparing hydrogen fluoride. In particular, this invention relates to the electrolysis of a catholyte selected from the group consisting of alkali metal fluoride and ammonium fluoride solutions in an electrolytic cell wherein said catholyte is separated from an electrically conductive anolyte by an anion exchange membrane. More particularly, this invention relates to the electrolysis of a catholyte of an ammonium fluoride solution, such as that obtained from the reaction of fluosilicic acid and ammonia or ammonium hydroxide, in an electrolytic cell wherein said catholyte is separated from an electrically conductive anolyte of hydrofluoric acid by an anion exchange membrane.

As used in the specification and claims hereof, the term "hydrogen fluoride" is intended to mean and include gaseous hydrogen fluoride and aqueous solutions thereof, i.e., hydrofluoric acid. Hydrogen fluoride and hydrofluoric acid are key chemicals in almost all fluorinating processes and find extensive application in non-fluorinating processes as a catalyst and reaction medium. The preparation of high purity hydrogen fluoride is not easily accomplished and is quite expensive. Heretofore, the manufacture of hydrogen fluoride has been based primarily upon the reaction of relatively pure fluorspar and sulphuric acid. Deposits of high-grade fluorspar are being depleted and therefore, it is important other sources be developed for the production of hydrogen fluoride. Fluosilicic acid ($H_2SiF_6$) is a waste material form phosphate rock acidulation in the phosphate and superphosphate fertilizer industry and as such represents a disposal problem for that industry.

Various methods have been proposed for producing hydrogen fluoride. For example, U.S. Patent 3,128,152 discloses the production of hydrogen fluoride by the oxidation of hydrogen ammonium difluoride. U.S. Patent 2,981,601 discloses the production of hydrogen fluoride from aluminum or ferric fluosulfates.

In accordance with the present invention, it has been found that hydrogen fluoride can be produced by electrolyzing a catholyte selected from the group consisting of alkali metal fluoride and ammonium fluoride solutions in an electrolytic cell wherein the anode compartment is separated from the cathode compartment by an anion exchange membrane. In accordance with this process, hydrogen fluoride is generated at the anode.

The catholyte utilized in the present electrolytic process can be obtained from any suitable source. In a particular embodiment, the alkali metal or ammonium fluoride solution is obtained by the reaction between fluosilicic acid and the corresponding hydroxide. When the mole ratio of the hydroxide to fluosilicic acid is greater than one, the reaction produces the alkali metal or ammonium fluoride and a precipitate of silica as depicted by the following over-all balanced equation for ammonium hydroxide.

$$6NH_4OH + H_2SiF_6 \rightarrow 6NH_4F + SiO_2 + 4H_2O$$

The use of less than one mole of hydroxide per mole of fluosilicic acid tends to produce the fluosilicate in preference to the fluoride. The exact quantity of hydroxide utilized can vary over a broad range and, in general, the mole ratio of alkali metal hydroxide or ammonium hydroxide to fluosilicic acid will range between about 1.5:1 and about 12:1 or more. Preferably, said mole ratio will vary between about 4:1 and about 8:1 and more preferably will be about 6:1.

The reaction between the above-recited hydroxides and fluosilicic acid does not go to completion with ease and, short of completion, the aqueous product solution resulting from said reaction contains the respective fluoride salt, a small amount of the respective bifluoride salt, fluosilicic acid, and the respective hydroxide. For example, in the case of ammonium hydroxide, the aqueous product solution contains ammonium fluoride, ammonium bifluoride, fluosilicic acid and ammonium hydroxide. These solutions can be processed further to obtain the substantially pure fluoride salt; however, the solutions, per se, also can be employed satisfactorily. As used in the specification and claims hereof, the term "alkali metal fluoride solution" is intended to mean and include an aqueous solution containing an alkali metal fluoride, an alkli metal bifluoride, or mixtures thereof. In addition, the term "ammonium fluoride solution" is intended to mean and include an aqeuos solution containing ammonium fluoride, ammonium bifluoride or mixtures thereof.

Any of the alkali metal hydroxides, i.e., sodium, lithium, potassium, rubidium, or cesium hydroxide, in addition to ammonium hydroxide or ammonia, can be utilized to prepare the catholyte solution used in the present process. Ammonium hydroxide is, however, preferred due to the greater solubility of ammonium fluoride in water as compare to the alkali metal fluorides.

The electrolytic cell employed in the present novel process can be any of the conventionally used cells that have the anolyte separated from the catholyte by a permselective membrane provided that the material from which the cell is constructed is inert to the action of the electrolytes and products produced as the result of electrolysis, e.g., hydrogen fluoride. In the present process, the electrolytic cell typically can be constructed of polyvinyl chloride, rubber-lined steel, polyfluorohydrocarbons of which Teflon is illustrative, or other non-conductive corrosion resistant materials. In its simplest configuration, the electrolytic cell contains two compartments which are separated by an anion exchange membrane. Large laboratory or commercial type cells be compared of multiples of such a cell.

The anode employed in the present electrolytic process can be graphite, impregnated graphite, or other suitable materials substantially resistant to the action of the anolyte and products produced in the anolyte compartment. The cathode can be steel, nickel, iron, or other suitable materials substantially resistant to the catholyte and products formed in the catholyte compartment. In addition, it is preferred that the cathode have a low hydrogen overvoltage value.

The anion exchange membrane employed in the above-described electrolytic cell can be any of the anion exchange membranes conventionally employed in electrolytic processes, provided that such membrane is corrosion resistant to the cell environment of the present process. In general, such membranes are composed of either a homogeneous or heterogeneous polymeric lattice, containing dissociable ionic groups, which can be reinforced with thermosetting resins or other non-conductive materials. The dissociable ionic groups consist of relatively immobile ions of one charge and mobile ions of the opposite charge. The immobile ions repel ions of like sign and attract ions of opposite sign. Under the influence of a direct electric current, ions having a charge the same as the mobile ions contained in the polymeric lattice are attracted by the relatively immobile ions and permeate the membrane, while ions of the opposite charge are repelled.

The anion exchange membrane should be high in selectivity, i.e., it should exclude the passage of cations; have low electrical resistance, so as to permit a free flow of anions through the membrane at low energy requirements; have high mechanical strength; and be highly resistant to all forms of degradation.

Suitable examples of anion exchange membranes are membranes prepared from a monovinyl aromatic-polyvinyl aromatic copolymer matrix, such as a styrene-divinylbenzene copolymer. Chloromethylation of the aromatic nucleus in the aforementioned polymeric matrix, followed by amination with teritary amines so as to affix quaternary ammonium groups to the polymeric matrix, result in the production of anion exchange membranes. See, for example, U.S. Patents 2,591,573 and 2,591,574. Other anion exchange membranes that suitably can be employed are either homogeneous or heterogeneous reinforced films that contain anion exchange sites, e.g., membranes prepared from Amberlite IRA–400 or melamine-guanidine formaldehyde resins, as described in U.S. Patents 2,636,851, 2,681,319 and 2,730,768. Other typical anion exchange membranes that can be utilized in the present process are described in U.S. Patents 2,731,425, 2,732,351, 2,780,604, 2,800,445 and 3,004,909.

In general, the current density applied to the electrolytic cell can vary over a wide range. Typically, the current density will range between about 10 and about 200 amps per square foot and, preferably, will range between about 100 and 150 amps per square foot. The voltage potential applied across the anode and cathode of the electrolytic cell also can vary over a broad range. Typically, the voltage potential will be between about 3 and about 12 volts and, preferably, will be between about 3 and about 6 volts.

The temperature at which the electrolytic cell can be operated can vary over a broad temperature range; however, in general, said temperature range will vary between about 60 and about 230° F.

The catholyte utilized in the above-described electrolytic cell is, as described hereinabove, selected from the group consisting of alkali metal fluoride solutions and ammonium fluoride solutions. These solutions can be obtained by any suitable technique such as, for example, by the above-described reaction between fluosilicic acid and an alkali metal or ammonium hydroxide.

The anolyte utilized in the above-described electrolytic cell is, in general, an electrically-conductive liquid that is not harmful to the operation of the cell. By electrically conductive is meant that the conductivity of the anolyte should be sufficient to allow the flow of electrons. Due to the nature of the present process, the conductivity of the anolyte will increase with time until a maximum is reached because of the formation of hydrofluoric acid in the anolyte. Typically, the anolyte is water and, preferably, is water to which a conductivity additive has been added, although tap water is often sufficient. The conductivity additive should be readily ionizable and have no adverse effect on the operation of the cell, such as by forming insoluble salts. Suitable examples of such conductivity additives include sulfuric acid, ammonium sulfate and hydrofluoric acid. Generally, a concentration of 0.0001 Normal of the additive is sufficient to initiate electrolysis; however, higher concentrations, e.g., between about 0.001 and about 0.1 Normal, can be used. Hydrofluoric acid is the preferred anolyte. It can be used in almost any concentration and will not interfere with the operation of the electrolytic cell. Suitably, a concentration of between about 0.5 and about 4 wt. percent or more of hydrofluoric acid can be employed as the anolyte.

In a typical illustration of the present process, an ammonium fluoride solution, such as that prepared by the reaction of fluosilicic acid with ammonium hydroxide, is introduced into the cathode compartment of an electrolytic cell. The anode compartment, which is separated from the cathode compartment by an anion exchange membrane, is charged with a dilute solution, e.g., 2 wt. percent, of hydrofluoric acid. Under the influence of a direct electric current, fluoride ions pass through the anion exchange membrane and combine with hydrogen ions, formed in the anode compartment as a result of the electrolysis of water, to form hydrogen fluoride.

Gaseous ammonia is formed in the cathode compartment and is emitted therefrom. The ammonia formed can be collected in any conventional manner and employed to prepare ammonium hydroxide which can then be utilized to further react with additional fluosilicic acid. Minor amounts of ammonium hydroxide present or formed in the cathode compartment react with any fluosilicic acid present to form additional ammonium fluoride.

Hydrogen fluoride forms a constant boiling azeotrope with water at a concentration of 38.2 weight percent hydrogen fluoride. Thus, gaseous hydrogen fluoride can be directly obtained from the anolyte by establishing a concentration of hydrofluoric acid in the anolyte of greater than 38.2 weight percent. The exact concentration is dependent on the temperature at which the cell is operated and can be obtained from the liquid-vapor equilibrium curve for hydrogen fluoride. For example, if the cell is operated at 180° F., the concentration of hydrofluoric acid in the anolyte will have to be approximately 62 weight percent before appreciable quantities of gaseous hydrogen fluoride can be recovered. Hydrogen fluoride distilled from the anolyte as a gas contains a small amount of entrained and absorbed water. This water can be removed by conventional techniques, e.g., stripping. Hydrogen fluoride gas can be recovered and stored by any convenient technique, such as by being absorbed in a gas absorber. Hydrofluoric acid obtained as product from the anolyte can be used as such, concentrated and used, or treated by conventional techniques to obtain hydrogen fluoride gas.

The present novel process is more particularly described in the following examples which are intended as illustrative only since numerous modifications and variations therein will be apparent to those skilled in the art.

EXAMPLE I

A. Anion exchange membrane

The anion exchange membrane utilized in the present example was a heterogeneous film containing a strongly basic anion exchange resin consisting of cross-linked polystyrene containing quaternary ammonium groups and reinforced with woven nylon net.

B. Electrolytic cell

An electrolytic cell was constructed from two 2-inch diameter polyvinyl chloride 90° pipe L's connected together by a bolted flange. The anion exchange membrane described above (paragraph A) was gasketed between the two flanges and served to divide the cell into an anode and cathode compartment. A graphite anode and nickel cathode were inserted through holes drilled in the back of the L's and were secured by rubber stoppers. The active area of each of the electrodes was 0.48 square inch and the gap between the electrodes was 0.50 inch.

C. Preparation of ammonium fluoride salt

One hundred (100) grams of 30 weight percent fluosilicic acid, 500 grams of water, and 78 grams of 28 weight percent aqueous ammonia were admixed in a suitable vessel at room temperature (about 77° F.) and agitated vigorously. The admixture was filtered and washed with water at 85° F. The filtered solids contained approximately 12 grams of silica ($SiO_2$) and the filtrate contained approximately 24 grams of fluoride ion calculated as HF. Some silica was present in the filtrate.

D. Operation of cell 278.8 grams of the ammonium fluoride solution prepared above (paragraph C) were charged to the cathode compartment of the electrolytic cell described above (paragraph B). This solution was approximately 6 percent by weight ammonium fluoride. The anode compartment was charged with 310.2 grams of 49.3 weight percent hydrofluoric acid. A direct current of about 0.5 amp at about 3.45–3.70 volts was applied to the cell for 100 minutes and the amount of fluoride ion present in the anolyte and catholyte determined. A summary of the material balance is tabulated in Table I.

TABLE I

|  | Anolyte | Catholyte |
|---|---|---|
| Grams F- charged | 150.2 | 17.55 |
| Grams F- recovered | 151.0 | 16.66 |

The data in Table I show that the anolyte compartment gained 0.8 gram of fluoride ion and the catholyte compartment lost 0.89 gram of fluoride ion for a percent accountability of 99.9 percent. The amount of fluoride ion produced was about 1.06 grams/amp-hour.

EXAMPLE II

In accordance with the procedures of Example I, 263.4 grams of an ammonium fluoride solution were charged to the catholyte compartment of the electrolytic cell of Example I. The anolyte compartment was charged with 296.5 grams of 49.3 weight percent hydrofluoric acid. Electrolysis was conducted for 6 hours at a temperature of 25–28° C. with a direct current of 0.5 amp and voltage potential of about 4.60 volts. A summary of a material balance on fluoride ion is found in Table II.

TABLE II

|  | Anolyte | Catholyte |
|---|---|---|
| Grams F- charged | 135.44 | 15.04 |
| Grams F- recovered | 138.02 | 12.97 |

The data in Table II show that the anolyte compartment gained 2.58 grams of fluoride ion and the catholyte compartment lost 2.07 grams of fluoride ion for a percent accountability of 100.33 percent. The amount of fluoride ion produced was about 0.86 gram/amp-hour.

While there are above described a number of specific embodiments of the present invention, it is obviously possible to produce other embodiments and various equivalent modifications thereof without departing from the spirit of the invention.

Having set forth the general nature and specific embodiments of the present invention, the true scope is now particularly pointed out in the appended claims.

What is claimed is:

1. A method of preparing hydrogen fluoride, which comprises preparing a catholyte by the reaction of fluosilicic acid and a member selected from the group consisting of alkali metal hydroxides, ammonia and ammonium hydroxide, electrolyzing said catholyte selected from the group consisting of alkali metal fluoride solutions, and ammonium fluoride solutions in an electrolytic cell wherein said catholyte is separated from an electrically-conductive anolyte by an anion exchange membrane so as to produce hydrogen fluoride at the anode.

2. A method according to claim 1 wherein said electrically-conductive anolyte is hydrofluoric acid.

3. A method according to claim 1 wherein said ammonium fluoride solution is a solution comprising ammonium fluoride and ammonium bifluoride.

4. A method according to claim 1 wherein said ammonium fluoride solution is a solution comprising ammonium fluoride and ammonium bifluoride.

5. A method according to claim 1 wherein said anolyte initially comprises water and a conductivity additive, the concentration of said additive being at least about 0.0001 Normal.

6. A method according to claim 1 wherein said anolyte is hydrofluoric acid having an initial concentration of between about 0.5 and about 4 weight percent.

7. A method of preparing hydrogen fluoride, which comprises preparing a catholyte by the reaction of fluosilicic acid and a member selected from the group consisting of alkali metal hydroxides, ammonia and ammonium hydroxide, electrolyzing said catholyte selected from the group consisting of alkali metal fluoride solutions and ammonium fluoride solutions in an electrolytic cell wherein said catholyte is separated from an anolyte of hydrofluoric acid by an anion exchange membrane so as to produce hydrogen fluoride at the anode.

8. A method according to claim 7 wherein said anolyte of hydrofluoric acid has an initial concentration of greater than 38.2 weight percent hydrogen fluoride.

References Cited

UNITED STATES PATENTS

| 2,863,813 | 12/1958 | Juda et al. | 204—180 |
| 3,124,520 | 3/1964 | Juda | 204—94 XR |
| 3,135,673 | 6/1964 | Tirrell et al. | 204—103 XR |
| 3,291,708 | 12/1966 | Juda | 204—128 |

OTHER REFERENCES

Ephraim: Inorganic Chemistry, 4th ed. (1943), p. 217, copy in Group 110.

J. H. MACK, *Primary Examiner.*

D. R. JORDAN, *Assistant Examiner.*

U.S. Cl. X.R.

204—180